US008462209B2

(12) United States Patent
Sun

(10) Patent No.: US 8,462,209 B2
(45) Date of Patent: Jun. 11, 2013

(54) DUAL-SWATH IMAGING SYSTEM

(75) Inventor: Xiuhong Sun, Windham, NH (US)

(73) Assignee: Keyw Corporation, Hanover, MD (US)

( * ) Notice: Subject to any disclaimer, the term of this patent is extended or adjusted under 35 U.S.C. 154(b) by 851 days.

(21) Appl. No.: 12/492,458

(22) Filed: Jun. 26, 2009

(65) Prior Publication Data

US 2010/0328499 A1 Dec. 30, 2010

(51) Int. Cl.
*H04N 7/18* (2006.01)

(52) U.S. Cl.
USPC .......................................... 348/144; 348/159

(58) Field of Classification Search
USPC .................................. 348/36, 42, 144, 218.1
See application file for complete search history.

(56) References Cited

U.S. PATENT DOCUMENTS 5,166,789 A * 11/1992 Myrick ......................... 348/144
5,499,051 A 3/1996 Suda et al.
5,602,584 A 2/1997 Mitsutake et al.
5,604,534 A * 2/1997 Hedges et al. ................ 348/144
5,668,595 A 9/1997 Katayama et al.
5,682,198 A 10/1997 Katayama et al.
5,699,108 A 12/1997 Katayama et al.
5,760,884 A 6/1998 Yahashi et al.
5,798,791 A 8/1998 Katayama et al.
5,860,912 A 1/1999 Chiba
5,889,553 A * 3/1999 Kino et al. ................. 348/218.1
5,937,212 A 8/1999 Kurahashi et al.
6,097,430 A 8/2000 Komiya et al.
6,141,036 A 10/2000 Katayama et al.
6,236,748 B1 5/2001 Ikjima et al.
6,323,858 B1 11/2001 Gilbert et al.
6,735,348 B2 * 5/2004 Dial et al. ..................... 382/293
6,778,211 B1 8/2004 Zimmermann et al.
6,798,984 B2 * 9/2004 Antikidis ........................ 396/13
7,009,638 B2 3/2006 Gruber et al.
7,075,735 B2 7/2006 Nozawa et al.

(Continued)

FOREIGN PATENT DOCUMENTS

JP 8313825 11/1996
JP 10155104 6/1998

OTHER PUBLICATIONS

Savopol, F., Chapman, M., Boulianne, M.; A Digital Multi CCD Camera System for Near Real-Time Mapping; 2000; International Archives of Potogrammetry and Remote Sensing; vol. XXXIII Part B1 pp. 266-271.*

(Continued)

*Primary Examiner* — Mehrdad Dastouri
*Assistant Examiner* — Jeremaiah C Hallenbeck-Huber
(74) *Attorney, Agent, or Firm* — Morrison & Foerster LLP

(57) ABSTRACT

A portable, aerial, dual-swath photogrammetric imaging system comprising twin nadir pointing CCD cameras for simultaneously acquiring twin adjacent digital images for merging into a large panorama. A pair of lens shifters symmetrically shift twin images to the left and right sides of the focal points of two parallel lenses to extend imaging swathwidth. The twin adjacent images of the imaging system have a strip of narrow overlap at the center of the whole scene that are reserved for photogrammetric processing and stitching twin images into a seamless panorama. Each camera is connected to an embedded computer which controls imaging data acquisition, attaches GPS/IMU measurements, generates KML metadata files for its snapshots, and stores acquired images and metadata into removable SSDs. Direct geo-referenced panoramic digital stills are immediately registered on to Google™ Earth precisely. Its images can be further processed for advanced mapping, change detection and GIS applications.

16 Claims, 6 Drawing Sheets

U.S. PATENT DOCUMENTS

| | | | | |
|---|---|---|---|---|
| 7,126,630 | B1 | 10/2006 | Lee et al. | |
| 7,190,389 | B1 * | 3/2007 | Abe et al. | 348/42 |
| 7,221,364 | B2 | 5/2007 | Matsumoto et al. | |
| 7,262,799 | B2 | 8/2007 | Suda | |
| 7,324,135 | B2 | 1/2008 | Ouchi et al. | |
| 7,333,725 | B1 | 2/2008 | Frazier | |
| 7,353,114 | B1 | 4/2008 | Rohlf et al. | |
| 7,493,037 | B2 | 2/2009 | Inaba | |
| 7,856,180 | B2 * | 12/2010 | Chishima | 396/324 |
| 7,924,311 | B2 * | 4/2011 | Yoshida et al. | 348/159 |
| 2004/0264763 | A1 | 12/2004 | Mas et al. | |
| 2005/0207672 | A1 * | 9/2005 | Bernardo et al. | 382/284 |
| 2008/0143842 | A1 | 6/2008 | Gillard et al. | |
| 2010/0073371 | A1 * | 3/2010 | Ernst et al. | 345/428 |
| 2010/0265329 | A1 * | 10/2010 | Doneker | 348/144 |

OTHER PUBLICATIONS

Gruber, M. et al., “Digital Surface Models From Ultracam-X Images,” Stilla U et al (Eds) PIA07; International Archives of Photogrammetry, Remote Sensing and Spatial Information Sciences, 36 (3/W49B), Munich, Germany, Sep. 19-21, 2007.

Leberl, Franz W. et al., “Novel Concepts for Aerial Digital Cameras”, ISRS Archives, vol. 34, Part 1, Proceedings of the ISPRS Commission 1 Symposium, Denver, Colorado, Nov. 2002.

Leberl, Franz W., et al., “Flying the New Large Format Digital Aerial Camera Ultracam” , Proceedings of the Photogrammetric Week, Stuttgart, Germany, 2003.

Petrie, Gordon, “Systematic Oblique Aerial Photography Using Multiple Digital Frame Cameras”, Photogrammetric Engineering & Remote Sensing, Feb. 2009, pp. 102-107.

Sun, X., W Chen, J. J. Baker, D. E. Florence, R. L. Fischer, J. G. Ruby, J. C. Eichholz (2006b) “A Precision Geo-referenced Digital Airborne Camera System” Presented on 2006 IEEE International Geoscience and Remote Sensing Symposium & 27th Canadian Symposium on Remote Sensing, Denver, Colorado, USA, Jul. 31-Aug. 4, 2006.

Sun, X., W. Chen, B. C. Patterson, D.E. Florence, R.L. Fischer, M. Jones, J.C. Eichholz, J. E. Richards, P. Shu, M. Jhabvala, a. La, D. Kahle, and J Adams (2007), “An Advanced Airborne Multisensor Imaging System for Fast Mapping and Change Detection Applications,” Proceedings of 2007 IEEE International Geoscience and Remote Sensing Symposium, Barsalona, Spain, Jul. 23-28, 2007, pp. 600-605.

Sun, X., and W. Chen (2008), “A Portable Airborne Multi-sensor Imaging System,” Proceedings of 2008 IEEE International Geoscience and Remote Sensing Symposium, Boston, Massachusetts, USA, Jul. 10-15, 2008.

* cited by examiner

DUAL-SWATH IMAGING SYSTEM

BACKGROUND OF THE INVENTION

1. Field of the Invention

This invention relates to photogrammetric imaging systems and, in particular to a dual-swath electro-optical imaging system for use in fixed wing aircrafts, helicopters, and unmanned aerial vehicles (UAV) to acquire large-format, wide-swathwidth color imagery with centimeter-level resolution.

2. Description of Related Art

Remote sensing applications from natural disaster response to warfighting and peace keeping operations require an advanced airborne imaging system to provide fast and large format geo-referenced and orthorectified image maps.

Many airborne digital frame camera systems have come into use for mapping, reconnaissance, and surveillance applications. A major limitation is the size of the CCD and CMOS area arrays currently available for use in such systems. As a result, widespread use of digital aerial photographic systems has occurred featuring multiple arrays, multiple lenses or multiple cameras in order to provide large ground coverage and big image format at a high ground resolution by a single flight.

In an article by Gordon Petrie entitled "Systematic Oblique Aerial Photography Using Multiple Digital Frame Cameras", published February 2009 in Photogrammetric Engineering and Remote Sensing, various twin cameras systems, and multiple camera systems are described. Twin camera systems include "DiMAC" Wide from DiMAC Systems in Belgium, a Dual-DigiCAM system from IGI in Germany and a Rollei Metric (now Trimble) in Germany. All three of these twin camera units have a rather similar specification with each individual camera module having a digital image sensor back that produces images of 7.2K×5.4K=39 megapixels in size. Their camera shutters are synchronized to operate simultaneously to obtain two oblique photos on either side of the flight line. After the rectification and the stitching together of the two rectified images, the final merged (near-vertical image is 10.5K×7.2K=75 megapixels in size. However, the tilted photographs acquired by oblique cameras have fan shaped imaging areas with variable resolutions across the different parts of the images. Those tilted photographs need extra work to be converted into the rectified images for Geographic Information System (GIS) application needs. Extra cost is associated with these extra tilted-photograph processes, including to correct the fan shaped images with variable resolution to rectangular images with data interpolation, which wastes the precious image resources, introduces artifices, and sacrifices image quality.

U.S. Pat. No. 7,009,638 issued Mar. 2, 2006 to Michael Gruber et al. and assigned to Vexcel Imaging GmbH, discloses a large format digital camera system exposing multiple detector arrays with one or more single lens systems to acquire sub-images of overlapping sub-area of large area objects. The sub-images are stitched together to form a large format, digital macroimage which can be colored. However, this camera system typically uses four (4) lenses and fifteen (15) 35 mm format area sensor arrays, and is a fairly complicated system. The hardware is massive and heavy. It is complicated to build, calibrate, operate, and maintain. With 15 critical non-redundant sub-systems, it means a higher failure rate. Its lens set is fixed and unlikely to have an interchangeable option. Its composite image is asymmetrically overlapped and stitched. The patented processing solutions suggested many compromised options which means problematical. This system is unlikely to be widely accepted by the aerial photogrammetric and GIS industry even though the system manufacture has been sold to a large software manufacturer.

SUMMARY OF THE INVENTION

Accordingly, it is therefore an object of this invention to provide a portable dual-swath photogrammetric imaging system for airborne applications to acquire wide swathwidth large-format color photogrammetric images with centimeter-level resolution.

It is another object of this invention to provide a highly reliable simple two camera imaging system which simultaneously captures a pair of left and right nadir shooting digital aerial photos having a strip of narrow overlapping field at the center of its composed panoramic frame or the edges of the left and right images from each camera.

It is another object of this invention to provide a nadir shooting twin symmetrical lens imaging system that produces simultaneously captured left and right images with a center narrow overlapping strip that comprises radiometrically matched and digitally-registered image layers from the joining edges of the left and right images to form a seamless aerial panoramic image.

It is another object of this invention to provide a nadir shooting dual camera system that has a native uniform pixel resolution across its aerial freeze frame panoramic image when terrain is flat.

It is a further object of this invention to provide a dual camera system that acquires dual-swathes of two adjacent images with a narrow overlapped vertical strip at center. This narrow center overlap consists of a stereo pair that is acquired by two simultaneously exposed cameras with a fixed length of stereo baseline (distance between two shots) and the same attitude induced by aircraft roll, pitch, and yaw dynamics. This narrow strip of overlapped images can be more easily processed by simplified photogrammetric algorithms to provide a software altimeter or range finder function for this dual-swath imaging system.

It is another object of this invention to provide a portable airborne camera system using only two 6 cm by 4.5 cm format frame transfer CCD sensors to provide industrial leading large frame size options of 78 megapixels and 120 megapixels today and even higher pixel count options in the future.

It is another object of this invention to provide a portable airborne camera system using merely two sensors to provide the leading edge 14,200 pixel swathwidth ground track for 78 megapixel option and 18,800 pixel swathwidth for 120 megapixel option.

It is another object of this invention to integrate a GPS/IMU device for this twin camera imaging system that provides GPS time reference, direct image geo-reference, and direct image mosaic capabilities to all of its captured images.

It is yet another object of this invention to provide a dual camera system that acquires quickly deliverable precisely geo-referenced nadir shooting panoramic images rather than oblique shooting fan shaped images.

These and other objects are further accomplished by a dual swath imaging system comprising a first CCD camera mounted on a remote sensing platform, the first CCD camera comprises a first CCD imager and a nadir pointing first optical lens, a first lens shift mount attached between a body of the first camera and the first optical lens for shifting the first optical lens a predetermined distance left with respect to the first camera body and first CCD imager, a second CCD camera mounted on the platform adjacent to the first CCD camera, the second CCD camera comprises a second CCD imager and a nadir pointing second optical lens, a second lens shift mount attached between a body of the second CCD camera, and the second optical lens for shifting the second optical lens a predetermined distance right with respect to the body of the second CCD camera and the second CCD imager, the first CCD camera comprises the first CCD imager positioned on a right side of a first focal point of the first optical lens for capturing a left scene image, and the second CCD camera comprises the second CCD imager positioned on a left side of the second focal point of the second optical lens for capturing a right scene image. The dual-swath imaging system further comprises means for forming a dual-swath panoramic scene by narrow overlapping of the left scene image and the right scene image at adjacent edges. The first lens shift mount shifts the first optical lens a predetermined distance up to halfwidth of the first CCD imager, and the second lens shift mount shifts the second optical lens a predetermined distance up to half-width of the second CCD imager. The system comprises means for generating a trigger pulse for simultaneously activating the first camera and the second camera to acquire the left scene image and the right scene image.

The objects are further accomplished by a photogrammetric imaging system comprising a first CCD camera mounted on a platform having a nadir pointing first optical lens, and a second CCD camera mounted on the platform adjacent to the first CCD camera and having a nadir pointing second optical lens, the first CCD camera comprises a first CCD imager positioned on a right side of a first focal point of the first optical lens for capturing a left scene image, the second CCD camera comprises a second CCD imager positioned on a left side of a second focal point of a second optical lens for capturing a right scene image, means for geo-referencing the left scene image, means for storing the geo-referenced left scene image, means for geo-referencing the right scene image, means for storing the geo-referenced right scene image, and means for merging the geo-referenced left scene image and the geo-referenced right scene image to form a dual-swath panorama. The system comprises means for forming a panoramic scene by narrow overlapping of the left scene image and the right scene image at adjacent edges. The first optical lens attaches to a first lens shift mount and the second optical lens attaches to a second lens shift mount, the first lens shift mount being attached to the first CCD camera and the second lens shift mount being attached to the second CCD camera. The first shift mount and the second shift mount shift the first optical lens and the second optical lens whereby the first CCD imager and the second CCD imager are shifted on right and left focal points of the first optical lens and the second optical lens. The system comprises means for generating a trigger pulse for simultaneously activating the first camera and the second camera to acquire the left scene image and the right scene image. The left scene geo-referencing means comprises means for attaching real time GPS/IMU metadata measurements to each image captured and recorded. The right scene geo-referencing means comprises means for attaching real time GPS/IMU metadata measurements to each image captured and recorded, the imaging system wherein the means for forming a panoramic scene by narrow overlapping of the left scene image and the right scene image comprises means for generating digital elevation models wherein a measured width of the overlapping field provides a real time above ground level height and the imaging system wherein the system comprises minimal size and weight for portability and use in light manned and unmanned aerial vehicles.

The objects are further accomplished by a method for providing a dual-swath imaging system comprising the steps of mounting a first CCD camera on a remote sensing platform, the first CCD camera comprises a first CCD imager and a nadir pointing first optical lens, attaching a first lens shift mount between a body of the first camera and the first optical lens for shifting the first optical lens a predetermined distance with respect to the first camera body and first CCD imager, mounting a second CCD camera on the platform adjacent to the first CCD camera, the second CCD camera comprises a second CCD imager and a nadir pointing second optical lens, attaching a second lens shift mount between a body of the second CCD camera and the second optical lens for shifting the second optical lens a predetermined distance with respect to the second CCD camera and the second CCD imager, capturing a left scene image by the first CCD camera having the first CCD imager positioned on a right side of the first focal point of the first optical lens, and capturing a right scene image by the second CCD camera having the second CCD imager positioned on a left side of the second focal point of the second optical lens. The method wherein the method comprises the step of forming a dual-swath panoramic scene by narrow overlapping of the left scene image and the right scene image at adjacent edges, the step of attaching the first lens shift mount and, shifting the first optical lens a predetermined distance includes providing the predetermined distance to be up to a halfwidth of the first CCD imager, and the step of attaching the second lens shift mount and shifting the second optical lens a predetermined distance includes providing the predetermined distance to be up to a halfwidth of the second CCD imager.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENT

Figure 1:
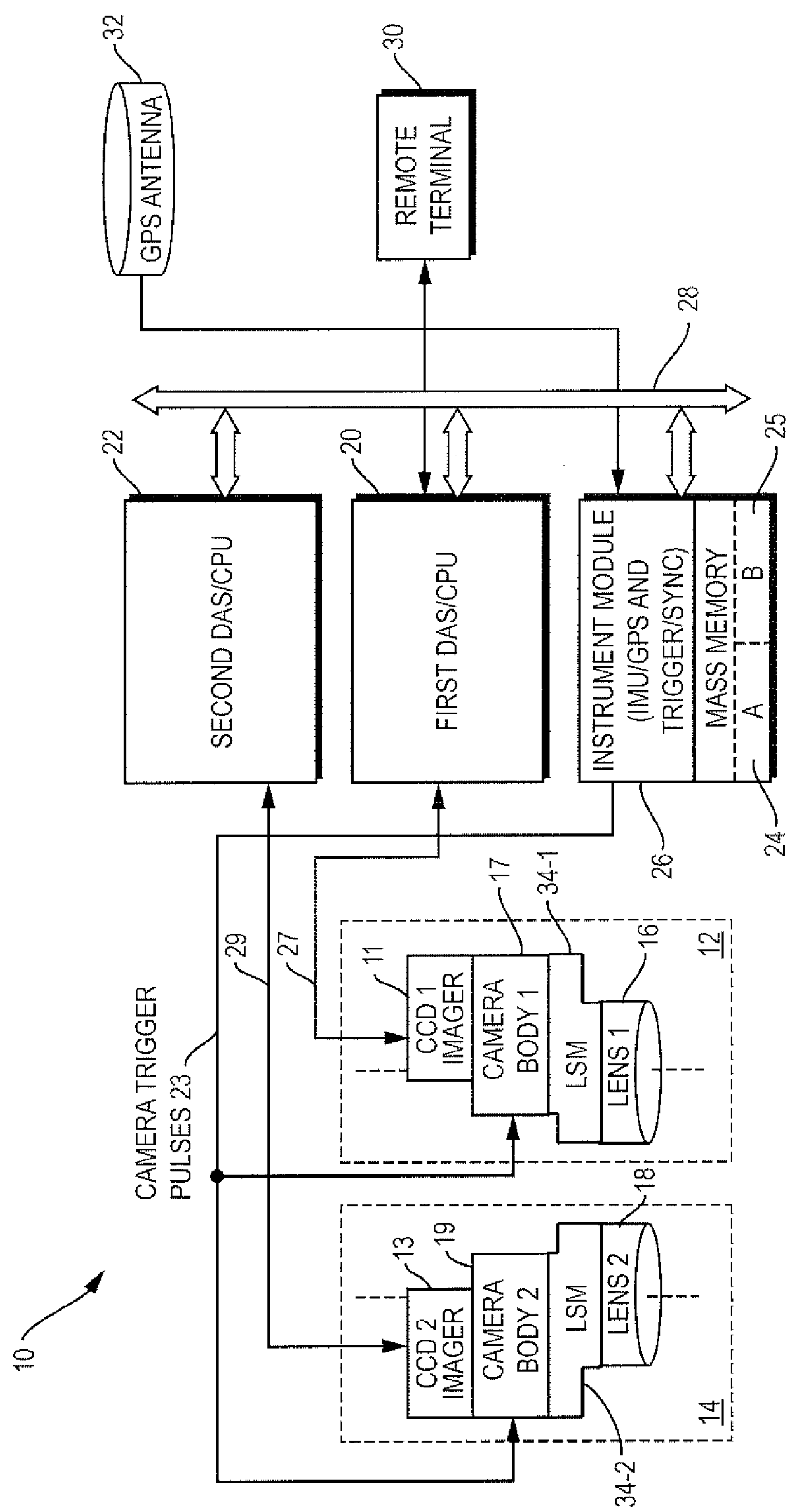
FIG. 1 is a block diagram of a dual-swath imaging system according to the present invention.

Referring to FIG. 1 a block diagram of a dual-swath electro-optical (EO) aerial imaging system 10 according to the present invention is shown comprising two cameras 12, 14 having two identical parallel mounted nadir pointing optical lenses 16, 18 with two identical CCD imagers 11, 13 mounted on a pair of specially configured camera bodies 17, 19. The camera bodies 17, 19 are attached to optical lenses 16, 18 with a pair of mechanical lens shift mounts (LSM) 34-1 and 34-2 which are mounted between camera 12 elements 16 and 17 and between camera 14 elements 18 and 19 with appropriate orientations to have the lens optical axes symmetrically shifted to left and right a predetermined distance to take dual images simultaneously (see FIGS. 2A and 2C).

Figure 6C:
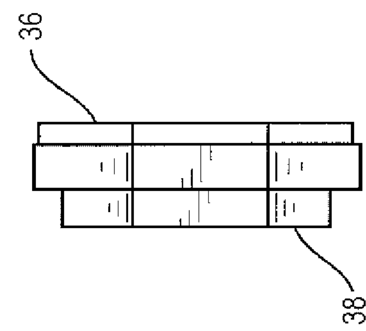
FIG. 6A, FIG. 6B, and FIG. 6C show the front, top and side views of a lens shift mount (LSM) for attaching a lens to a camera body and shifting the lens a predetermined distance perpendicularly to its optical axis.
Figure 6B:
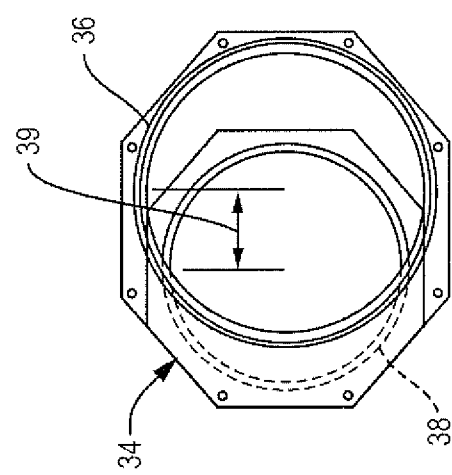
Figure 6A:
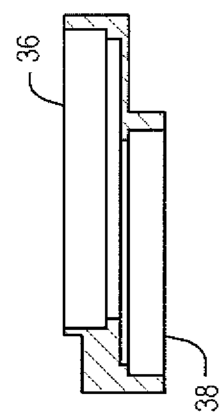

Referring to FIG. 1, FIG. 6A, FIG. 6B and FIG. 6C, FIGS. 6A, 6B and 6C show the front, top and side views of a lens shift mount 34 which are used to symmetrically shift the twin lenses 16, 18 a predetermined offset to their original optical axis locations. The lens shift mount 34-1 as shown in FIG. 1 has a first end 38 (FIG. 6B) that attaches to the camera body 17 and a second end 36 for attaching to the optical lens 16. This lens shift mount 34 shifts the lens a predetermined distance 39 (FIG. 6B) up to a half width of the CCD imagers 11, 13, which is determined by the width of the center overlap strip (for example, a 200 pixel width of the overlap when focused at infinity in the present embodiment) and results in the CCD imagers 11, 13 being symmetrically shifted on the left and right focal points of the lenses 16, 18 by approximately 23.17 mm each in the present embodiment. FIG. 6A and FIG. 6B show the orientation of the lens shift mount 34-2 for attaching to camera body 19. For attaching to camera body 17, the lens shift mount 34-1 is rotated 180 degrees from the position shown in FIG. 6B.

The two cameras 12 and 14 are triggered simultaneously by a common open/close trigger pulse 23 from a precision analog switch wired inside instrument module 26 when receiving a programmed CMOS-logic level pulse input from the main DAS/CPU unit 20. When triggered, camera 12 acquires digital images and sends image data 27 to a first DAS/CPU module 20 which includes a first data acquisition system (DAS) for interfacing with a first central processing unit (CPU) wherein both the DAS and CPU are integrated in the stackable module 20. Camera 14 acquires digital images simultaneously with Camera 12 and sends image data 29 to a second DAS/CPU module 22 which includes a second DAS for interfacing with a second CPU inside a second DAS/CPU module 22. The DAS/CPU module 20 processes and sends imaging data 27 of camera 12 to a removable solid state disk (SSD) 24 inside an IMU/GPS and mass memory multi-function instrument module 26 via a computer Serial ATA (SATA) data cable, which is a part of inter-module connection buses 28. The DAS/CPU module 22 processes and sends imaging data 29 of camera 14 to another removable solid state disk (SSD) 25 inside the multi-function instrument module 26 via another SATA cable in bus 28. Meanwhile the CPUs of DAS/CPU module 20 and DAS/CPU module 22 attach real time GPS/IMU metadata measurements from an IMU/GPS device of instrument module 26 to each image file captured and recorded. The instrument module 26 is connected to a GPS antenna 32 mounted on the roof top of an airplane. The data buses 28 provide a communication path for all data and control signals between the first DAS/CPU module 20, the second DAS/CPU module 22, and the instrument module 26 with the solid state disks 24, 25. Also, data buses 28 provide for system expansion and it is neatly located inside system 10. The imaging specifications for imagining system 10 are listed in Table 1.

TABLE 1

Dual-Swath Imaging System Specifications

| Imaging Parameters | Ranges and Values |
|---|---|
| Frame Size of 78 Megapixel configuration | 14,200 (H) × 5,400 (V) pixels |
| Frame Size of 120 Megapixel configuration | 18,800 (H) × 6,700 (V) pixels |
| CCD pixel dimensions for 78 MP configuration | 6.8 μm × 6.8 μm square |
| CCD pixel dimensions for 120 MP configuration | 6.0 μm × 6.0 μm square |
| Sustained framer rate (frames/minute) | Programmable, up to 30 |
| Focal lengths of Interchangeable lenses (mm) | 75, 105, 180 |
| Shutter speed (sec) | 1 to 1/4000 |
| Quantization depth (bits) | 16 |

The COD imagers 11, 13 may be embodied by a pair of Model P45+ CCD backs or Model P65+ CCD backs manufactured by Phase One Inc. of Melville, N.Y. The camera bodies 17, 19 may be embodied by Model 645ADFII manufactured by Mamiya America Corp. of Elmsford, N.Y. The lens 16, 18 may be embodied by Model 180 mm f/4.5 short barrel lenses manufactured by Mamiya which are designed for tilt-shift use and have a large dual swath imaging area of at least 4.1 cm×10.3 cm for the present application. The precision analog switches may be embodied by a MAX381/MAX383/MAX385 integrated circuit manufactured by Maximum Integrated Products of Sunnyvale, Calif. The commercial off-the-shelf (COTS) GPS/IMU may be embodied by model CNS-5000 manufactured by KVH Industries of Middletown, R.I.

Because the imaging system 10 is designed to be portable, weighing approximately 25 pounds by using lightweight and mobile CPUs and electronic components, the whole system is power saving. The power source can be either an aircraft power source (8-28 volt DC) or an optional High Power Polymer Li-Ion battery module. The Li-Ion battery module comprises 4 parallel connected 14.8 v Polymer Li-Ion batteries rated 6.4 Ah (or 94.82 Wh) each at 30 amp rate. The battery power source provides up to a total of 4 hour operation time for the whole imaging system. The DAS/CPU modules 20, 22 are embodied with a IEEE 1394 firewire data acquisition capability. An operational motherboard for each of the DAS/CPU modules 20, 22 may be embodied by model LV-679 Mini-ITX Motherboard with an INTEL® Core 2 DUO Mobile processor T7500 (2.2 GHz CPU) manufactured by Taiwan Commate Computer Inc. of Taipei Hsien, Taiwan.

Operator control of the imaging system 10 is provided by a terminal 30 either connected onboard or wirelessly connected on the ground. In addition, the DAC/CPU module 20 can be connected to an optional onboard processor instrument module with Down Link option (not shown) for communication and control of the imaging system 10 from a remote location.

Figure 2C:
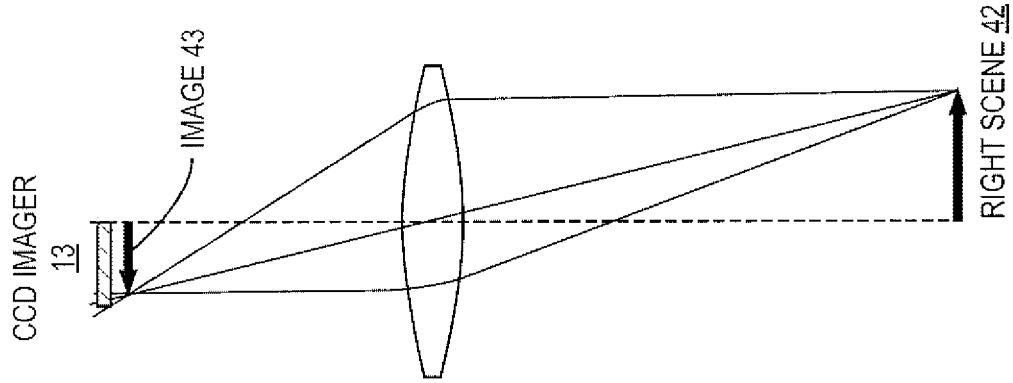
FIGS. 2A, 2B and 2C illustrate the imaging principle of the present invention.
Figure 2B:
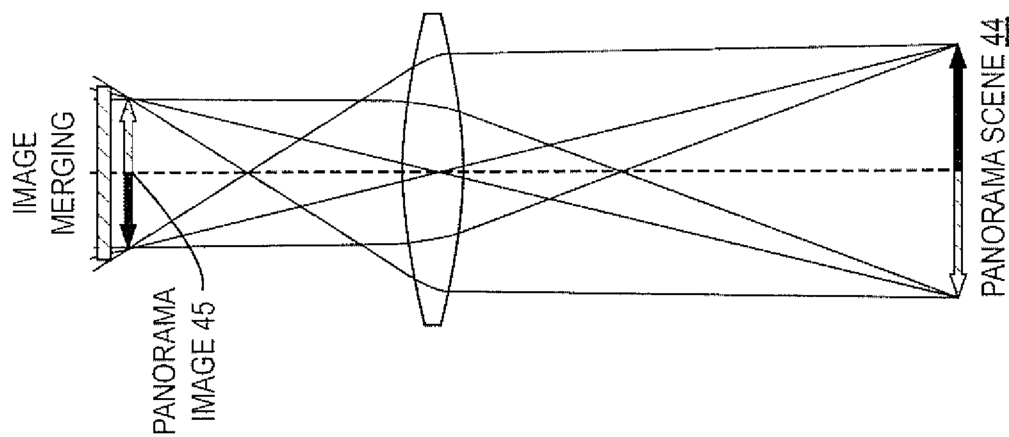
Figure 2A:
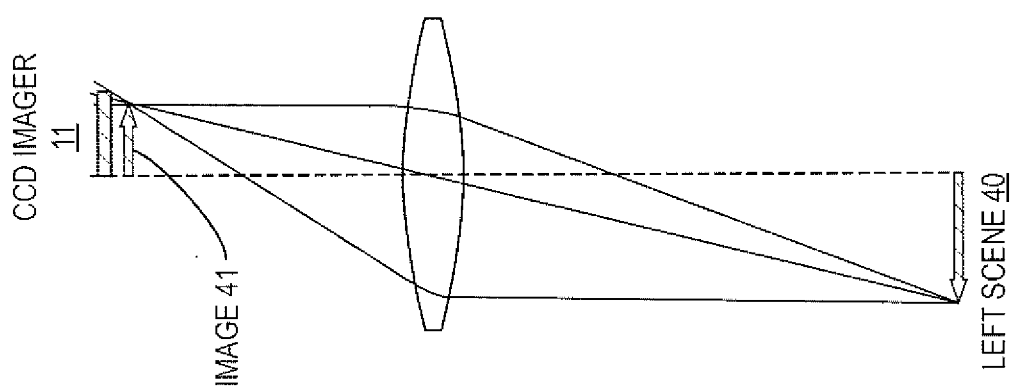

Referring now to FIGS. 2A, 2B and 2C, the imaging principle of the dual-swath imaging system 10 is illustrated. FIG. 2A shows a left scene 40 captured by CCD imager 11 of camera 12. FIG. 2C shows a right scene 42 captured by CCD imager 13 of camera 14, and FIG. 2B shows the left and right images 41, 43 can be merged into a panorama image 45 originally made up of the left scene 40 and the right scene 42 or the panoramic scene 44.

Figure 3:
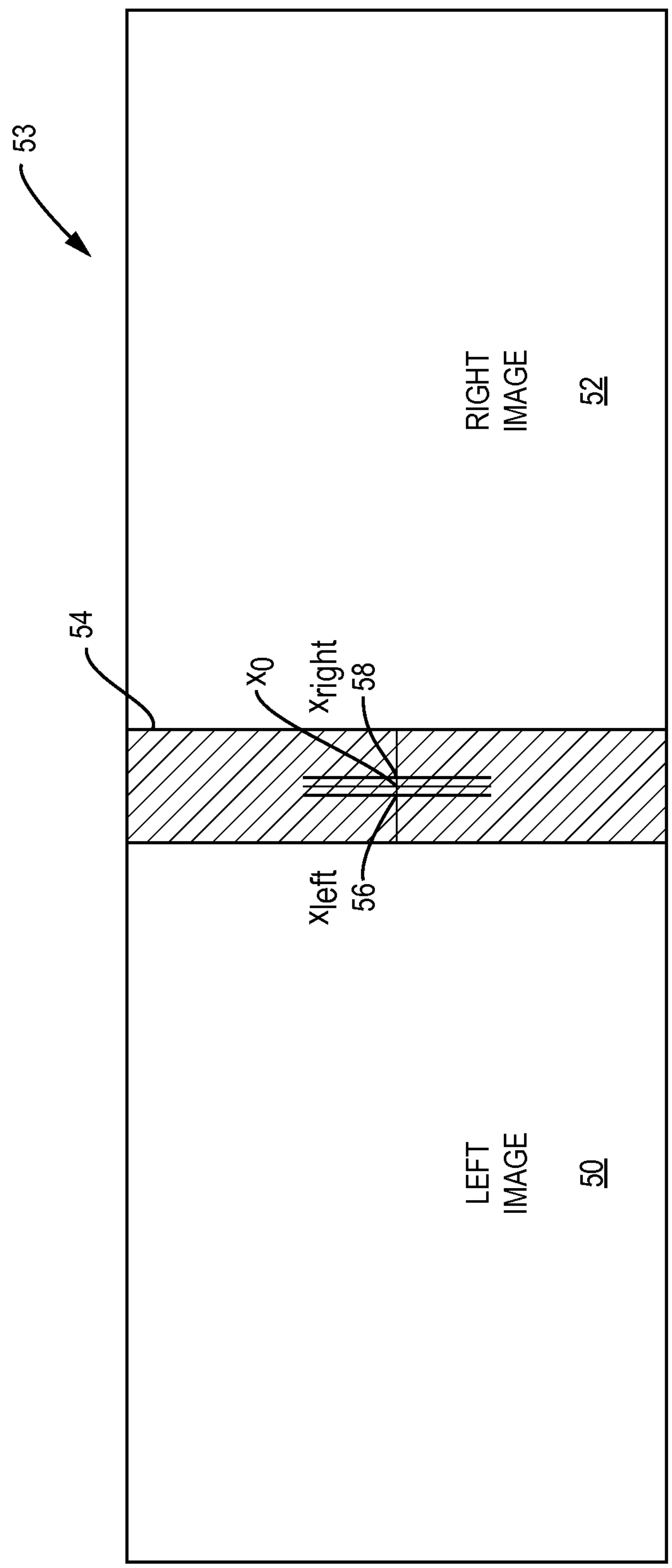
FIG. 3 illustrates left and right images provided by the two cameras of the imaging system with overlapping field according to the present invention.

Referring to FIG. 3, the pair of simultaneously captured dual-swath images 50, 52 from CCD Imagers 11 and 13 are illustrated, which form a panorama 53 with a narrow strip of overlapping field 54 at its center. In FIG. 3, $x_{left}$ 56 is illustrated as a predetermined point on the left image plane 50 for the focal point of the left camera 14 to be shifted to. A precisely machined lens shift mount 34-2 as shown in FIGS. 6A, 6B and 6C shifts a lens 18 from a manufacture default standard center mounting position, where the principal axis goes through the center of the imager 13, a pre-determined shifting distance 39 (FIG. 6B). With the lens shifting, $x_{left}$ 56 stands a coincidence point that the focal point of the left camera 14 stays on, the principal axis of the left lens 18 goes through, and the optical perspective center of the left camera 14 is projected on. Similarly, $X_{right}$ 58 is the predetermined reference point on the right image plane 52 for the focal point of the right camera 12 to be registered on. After a symmetrical lens shifting using the lens shift mount 34-1 in FIG. 1, $X_{right}$ 58 becomes a registered point that the focal point of the right camera 12 sits on, the principal axis of the right lens 16 passes through, and the optical perspective center of the right camera 12 is projected on. From a photogrammetric point of view, each of images 50 and 52 is associated with a photogrammetric collinearity condition locked with the optical perspective center of its corresponding camera. Hence, each of images 50 and 52 can be processed using a photogrammetric collinearity equation for general photogrammetric applications. The predetermined shifting distance 39 in FIG. 6 is designed (and manufactured) to be approximate 100 pixels shorter than the half CCD width to match the $X_{left}$ and $X_{right}$ allocation designs, resulting in a very narrow left and right image overlapping field 54 of about 200 pixel width for the dual swath panorama 53. Referring to FIG. 3, the perspective center baseline distance of the right and left cameras 12, 14 is illustrated as $d=|x_{right}-x_{left}|$. The shorter the two cameras 12, 14 baseline distance d is, the smaller the perspective difference is (such as relief displacement) within the overlapped field 54. In the present embodiment, twin cameras 12, 14 shown in FIG. 1 are nadir mounted adjacent to each other with a short baseline distance of 20 cm, which equals 20 pixels apart in image space in the case of a 1 cm pixel resolution flight at a low altitude. The 20 cm baseline for the twin cameras 12, 14 will become equivalent to or less than a pixel apart with a 20 cm resolution flight at a high altitude. In the latter case, $x_{right}$ and $x_{left}$ will be approaching on to $x_0$ (illustrated as the baseline center in FIG. 3) and the perspective difference within the narrow overlap strip of left and right images 50, 52 can be generally ignored, resulting in natively well registered left and right images and hence the left and right images 50, 52 can be easily and seamlessly stitched together by software methods. One of the commercial off-the-shelf (COTS) general image processing software tools, the Photoshop 4 has been used to direct stitch of the left and right images seamlessly, and its automation is implemented by a simple program which is easily coded by one of ordinary skill in the art using CS4 scripting language.

Figure 4:
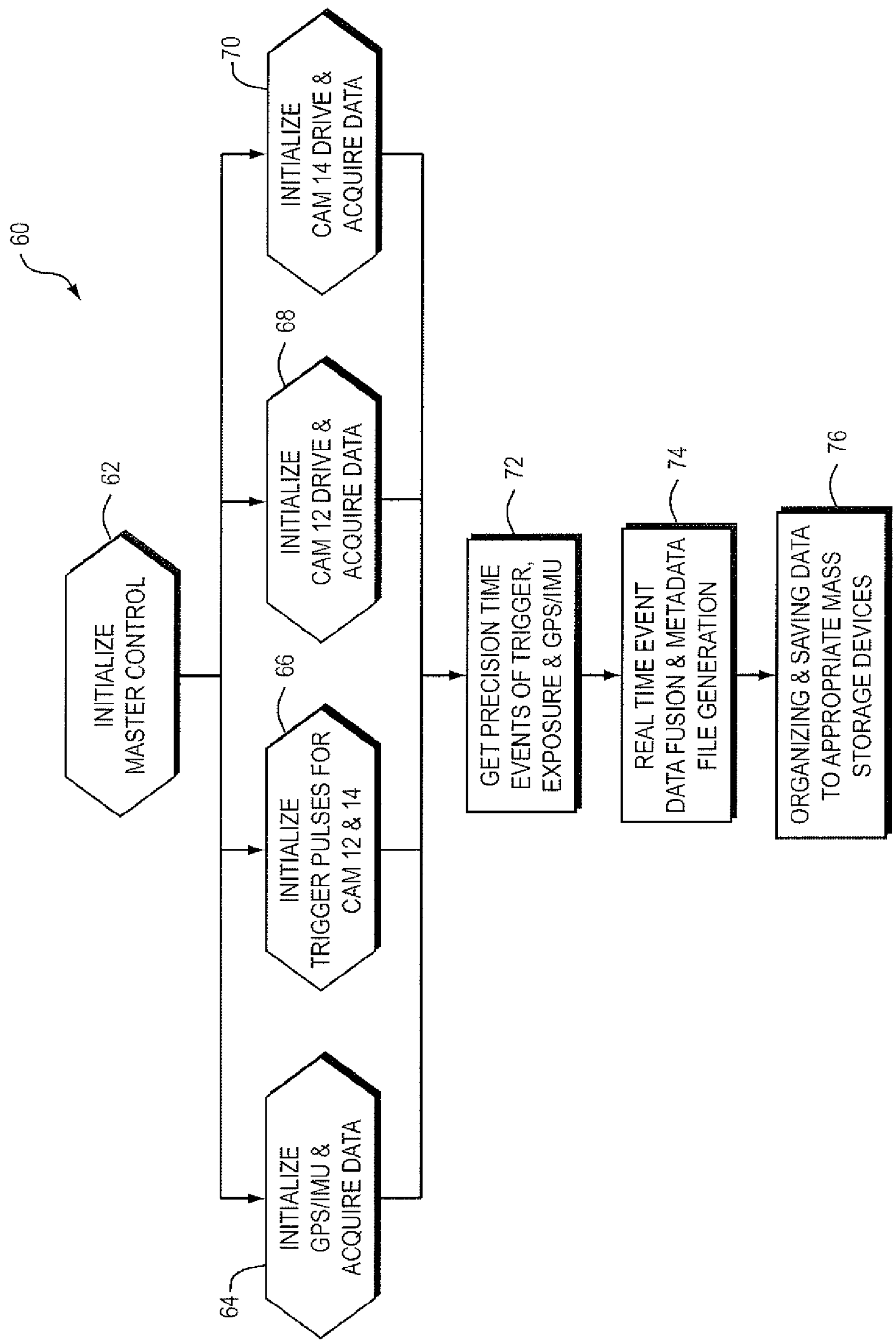
FIG. 4 is a block diagram of the data acquisition software program for operation of the dual-swath imaging system of FIG. 1.

Referring to FIG. 4, an easy-to-use data acquisition software package 60 is shown which runs the system 10 as a "black box". By starting Master Control software 62, it initializes and controls a suite of software across two networked processors and drives of system 10 for concurrent imaging and non-imaging data acquisition. The master control software 62 initializes in step 64 a GPS/IMU device in the instrument module 26 and acquires GPS/IMU position and attitude measurement data into dedicated computer buffer. It initializes in step 66 and tags time events for computer generated trigger pulses 23 that trigger Camera 12 and Camera 14 simultaneously (the trigger ports of Cameras 12 & 14 are parallel connected as shown in FIG. 1). It initializes in steps 68 and 70 Cameras 12 and 14 and their drives; in step 76 it collects and names image data, and directs the data to their dedicated SSDs 24, 25 and tags time events of each mid-point exposure into dedicated computer buffers and the GPS/IMU event buffer, where the mid-point exposure is precisely timed by the OEMV GPS receiver (manufactured by Novatel of Canada) inside the GPS/IMU device. In steps 74 and 76 the master software 60 organizes the event logging time series and reformats them into real-time metadata files for each frame captured and a collective metadata file for all frames captured for a whole line and then saves them into mass storage devices 24, 25. Not only are all high throughput imaging data streams and GPS/IMU measurement data streams recorded on the local solid, state drives (SSDs) 24, 25, but also they are optionally distributed to remote disk drives for pipelined further data processing such as JPEG 2000 compression. All imaging and non-imaging measurements are assigned with GPS-referenced time. The geo-reference frame metadata files are automatically generated in real time by the software in FIG. 4 to provide the position, velocity, and attitude solutions for each frame of exposures that are programmably triggered by the imaging system 10. These real time attitude measurements comprise the camera absolute orientations to an East-North-Up (ENU) local tangent reference coordinate system at the instant of the exposure in the form of pitch, roll, and yaw angles. The GPS/IMU (KVH CNS-5000) produces real time position and attitude estimations which give about 0.5 m position accuracy and 0.01 degree roll/pitch accuracy and 0.03 degrees yaw accuracy using WAAS GPS configuration. Using a Real Time Kinematic (RTK) GPS configuration, the position estimate can achieve up to 1 cm and the angular accuracy of the attitude measurement can be improved up to the instantaneous field of view using either a COTS third party post processing software like Inertial Explorer of NovAtel, in Canada or other known automatic postprocessing software known to one skilled in the art.

Figure 5:
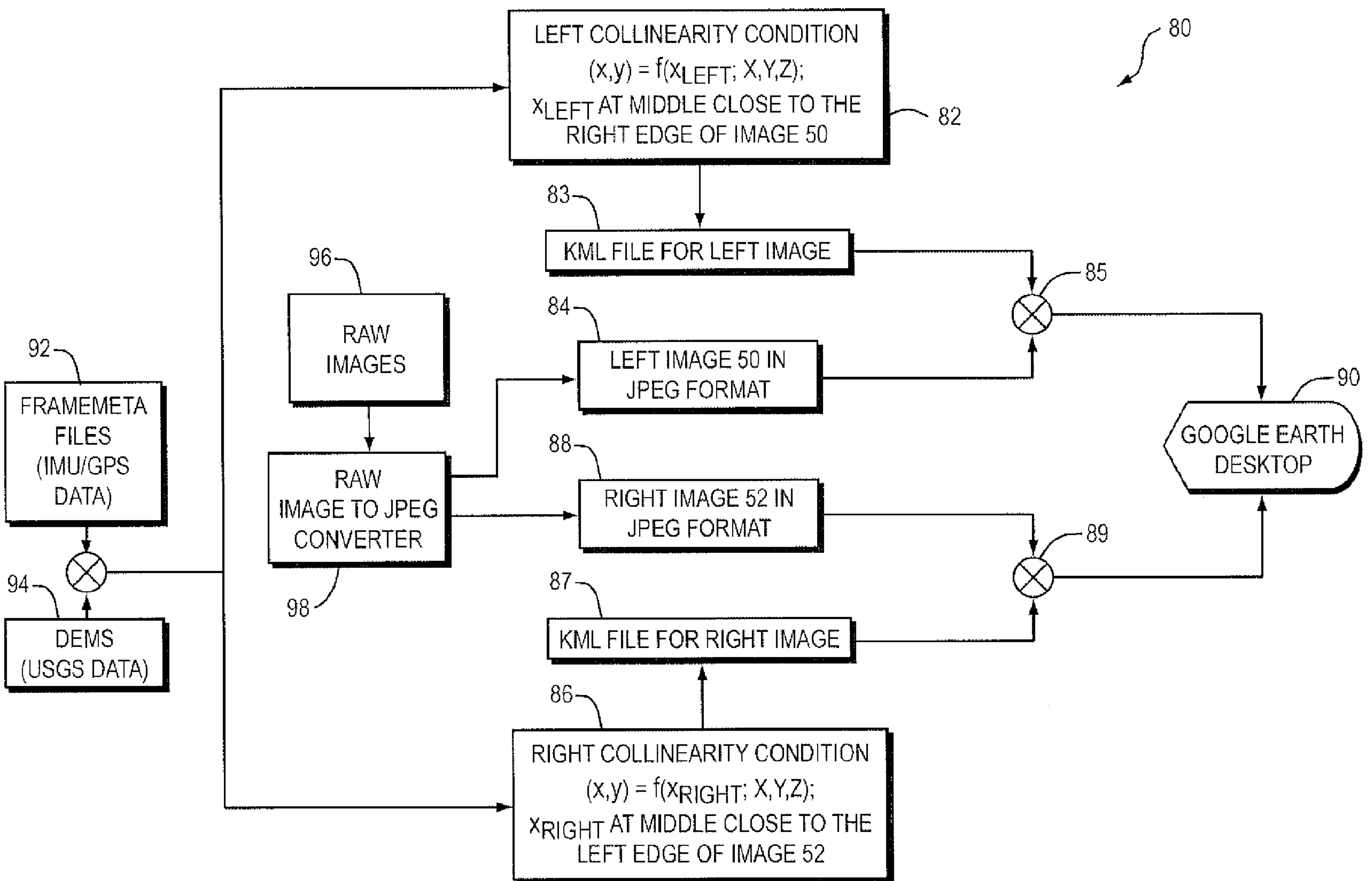
FIG. 5 is a block diagram of an automatic image batch processing method for geo-referencing, and stitching the overlapped dual-swath aerial images of FIG. 3.

Referring to FIG. 5, a block diagram 80 of a highly efficient automatic image geo-reference and stitch algorithm or method is shown. The algorithm directly geo-references the images of left and right scenes onto Google™ Earth using KML files and superimposes the left and right images on the top of Google™ Earth seamlessly. The block diagram 80 of FIG. 5 shows the steps required to implement the algorithm. In step 92 Framemeta files are provided wherein every frame comprises IMU/GPS data. In step 94 the digital elevation models (DEMs) are combined with Framemeta files. The DEMs can be provided from many possible resources such as the 1 arc-second Shuttle Radar Topographic Mapping (SRTM) data released by NASA and distributed by the U.S. Geological Survey (USGS) through ftp access (ftp://edcsgs9.cr.usgs.gov/pub/data/srtm/version1/), or a software altimeter lookup table generated by the center strip of the dual swath panorama. The Framemeta files with IMU/GPS data and the DEMs USGS data from steps 92 and 94 are combined and used in steps 82, 86 where photogrammetric collinearity equations, which define correlation of image coordinates to the corresponding point on the earth's surface tangent plane coordinates associated with a particular perspective center of the camera, are adopted. These equations are available in popular remote sensing text books. Description details for collinearity equations are known in the art. One example for any given surface scene point (X, Y, Z) on a local tangent plane that has an origin at (Xc, Yc, Zc), its image coordinates (x, y) associated with left camera focus point ($x_{left}$, $y_{left}$) is listed below:

$$x - x_{left} = -f\left[\frac{\cos\phi\cos\kappa(X - X_C) + (\cos\omega\sin\kappa + \sin\omega\sin\phi\cos\kappa)(Y - Y_C) + (\sin\omega\sin\kappa - \cos\omega\sin\phi\cos\kappa)(Z - Z_C)}{\sin\phi(X - X_C) - \sin\omega\cos\phi(Y - Y_C) + \cos\omega\cos\phi(Z - Z_C)}\right] \tag{1}$$

$$y - y_{left} = -f\left[\frac{\cos\phi\sin\kappa(X - X_C) + (\cos\omega\cos\kappa - \sin\omega\sin\phi\sin\kappa)(Y - Y_C) + (\sin\omega\cos\kappa + \cos\omega\sin\phi\sin\kappa)(Z - Z_C)}{\sin\phi(X - X_C) - \sin\omega\cos\phi(Y - Y_C) + \cos\omega\cos\phi(Z - Z_C)}\right]$$

By applying the GPS/IMU position for (Xc, Yc, Zc) and attitude measurements (for angle parameters in equation (1)) in the Framemeta data files 92 into the photogrammetric collinearity equations. Solving the collinearity equations in steps 82, and 86 and adopt (X, Y, Z) to the map datum of Google™ Earth Desktop in steps 82, 86 will have KML files for left and right images 50, 52 generated for use in steps 83 and 87. In step 96 camera raw images are received and converted to JPEG formats in step 98, wherein JPEG files for left image 50 and JPEG files for right image 52 are now available. The KML file 83 for the left image 50 that is a geo-reference file is combined with the JPEG format of the left image 50 in step 85 and provided to Google Earth Desktop 90, where the left image 50 is registered precisely on to Google Earth Desktop 90. The KML file 87 that is a geo-reference file and metadata file is combined in step 89 with the JPEG format of the right image 52 and provided to Google Earth Desktop 90, where right image 52 is registered precisely onto Google Earth Desktop and precisely superimposed on the left image 50 to form a freeze frame panorama snapshot as taken from a single panoramic imager, comprising 18,800 pixels in width when using a pair of 60.5 MP imagers. The above algorithm is fast. It is capable of stitching the dual-swath aerial images 50, 52 into the freeze-frame panoramic digital stills in real time. The dual-swath imaging system 10 collects twice as much high-resolution aerial imagery as that from a single imager in a single flight line, providing enhanced effectiveness and greater efficiency for fast airborne mapping and data processing.

Referring again to FIG. 1, FIG. 3, and FIG. 5, the narrow strip of overlapping field 54 is one of the unique features of the dual-swath imaging system 10 comprising the two cameras 12, 14. The overlapping field 54 may vary from 0 to several, hundreds of pixels with the change of the above ground level (AGL) height of the imaging system 10. The center overlap strip can be used to generate fast digital elevation models (DEMs) 94 at the center part of the image efficiently using the photogrammetric collinearity condition shown in FIG. 5. Because the overlapped strips are captured simultaneously with a fixed baseline distance of the optical centers (or lens centers; perspective centers) of two cameras 12, 14, the traditional DEMs deduction process can be greatly simplified. In this case, the baseline of the twin lens stereo exposures has a fixed distance at an accuracy of a few hundredths of millimeters, and the dual cameras 12, 14 are exposed simultaneously on the same airplane with the same position and roll, pitch, and yaw measurements. With aerotriangulation, there is a group of four collinearity equations to solve three unknowns (X, Y, Z) of a surface point within the narrow strip 54. This will not only provide a software range finder, but also make the strip orthorectified and mosaicked seamlessly and quickly for the panorama in the case $d=x_{right}-x_{left}$ can not be omitted.

In addition, even simpler and faster DEMs can be modeled by automatically measuring the width of the overlapping strip 54 since the width of the overlapping strip is proportional to the above ground level (AGL) height. In other words, the "width" is simply a scaled measure of a range finder by using a lookup table, which provides the real time AGL height of the camera exposure location, provided that the baseline distances of the twin-lens of the dual-swath cameras 12, 14 are fixed and known. With the integrated range finder functions of the dual-swath cameras 12, 14, its images can be direct geo-referenced in real time even without access of the ready to use DEMs.

The dual-swath imaging system 10 shown in FIG. 1 is intended for use and has been used in fixed wing aircrafts, helicopters, and unmanned aerial vehicles (UAVs) to acquire large-format natural-color imagery with centimeter-level resolution Frame sizes of 78 megapixel and 120 megapixel are provided for use in system 10 using optional interchangeable 75 mm, 105 mm and 180 mm lenses for producing panoramic imaging footprints for fast and wide coverage and high resolution aerial image collection.

What is claimed is:

1. A dual-swath imaging system comprising:

a pair of twin photogrammetric CCD cameras mounted on a remote sensing platform adjacent to each other;

a first of said twin photogrammetric CCD cameras comprises a first CCD imager and a nadir pointing first large format optical lens that is capable of imaging an extended panoramic rectangular area with a width twice as wide as that of said CCD imager of said twin cameras;

a first lens shift mount attached between a body of said first of said twin photogrammetric CCD cameras and said first large format optical lens for physically shifting said first large format optical lens to a predetermined point $x_{left}$ with respect to said first CCD imager, to make said predetermined point $x_{left}$ be on a focal point said first large format optical lens;

a second of said twin photogrammetric CCD cameras is symmetrically mounted on said platform adjacent to said first of said twin photogrammetric CCD cameras, said second of said twin photogrammetric CCD cameras comprises a second CCD imager and a nadir pointing second large format optical lens that are made the same as said corresponding first CCD imager and said first large format optical lens;

a second lens shift mount being mounted the same with the shift mirrored relative to the first lens shift mount and attached between a body of said second of said twin photogrammetric CCD cameras and said second large format optical lens for shifting the focal point of said second large format optical lens a mirrored reference point $x_{right}$ with respect to said second CCD imager to form a symmetrical focal point $x_{right}$;

said first of said twin photogrammetric CCD cameras comprises said first CCD imager shifted to a predetermined right side location and orientation of the focal point of said first large format optical lens for capturing a left scene image on a left side of said twin CCD cameras;

said second of said twin photogrammetric CCD cameras comprises said second CCD imager shifted to a predetermined left side location and orientation of the focal point of said second large format optical lens for capturing a right scene image on a right side of said twin CCD cameras; and a first principal axis of said first large format optical lens and a second principal axis of said second large format optical lens being aligned in parallel for obtaining a panorama from said left scene image and said right scene image.

2. The dual-swath imaging system as recited in claim 1 wherein said system comprises means for forming a nadir dual-swath panoramic view image with a rectangular imaging zone and uniform scale over a flat terrain.

3. The dual-swath imaging system as recited in claim 1 wherein:

said first lens shift mount shifts said first large format optical lens a predetermined distance for effective use of pixel resources of said first CCD imager for effectively extend a geospatial area coverage of the twin cameras; and said second lens shift mount shifts said second optical lens a predetermined mirrored distance for effective use of pixel resources of said second CCD imager for achieving double swath or maximizing geospatial area coverage of the twin camera imaging system.

4. The dual-swath imaging system as recited in claim 1 wherein said system comprises means for generating a trigger pulse for simultaneously activating said first of said twin photogrammetric CCD cameras and said second of said twin photogrammetric CCD cameras to acquire said left scene image and said right scene image simultaneously.

5. A photogrammetric imaging system comprising:

a first CCD camera of symmetric twin photogrammetric CCD cameras mounted on a platform, said first CCD camera having a nadir pointing first large format optical lens;

a second CCD camera of said symmetric twin photogrammetric CCD cameras mounted on said platform symmetrically adjacent to said first CCD camera, said second CCD camera having a nadir pointing second large format optical lens;

said first CCD camera comprises a first CCD imager positioned on a right side of a first focal point of said first large format optical lens for capturing a left scene image on a left side of said twin CCD cameras;

said second CCD camera comprises a second CCD imager positioned on a left side of a second focal point of a second large format optical lens for capturing a right scene image on a right side of said twin CCD cameras;

a first principal axis of said first large format optical lens and a second principal axis of said second large format optical lens being aligned in parallel or obtaining panoramic images from said left scene images and said right scene images for photomapping applications;

means for direct geo-referencing said left scene image using a sensor model based on a collinearity condition associated with said first CCD camera and an integrated GPS/IMU measurement of a dual swath imaging system;

means for storing said geo-referenced left scene image in a geographic information system (GIS) compatible image format with geospatial metadata attached thereto;

means for direct geo-referencing said right scene image using a sensor model based on said collinearity condition associated with said second CCD camera and the integrated GPS/IMU measurement of said dual swath imaging system;

means for storing said geo-referenced right scene image in GIS compatible image format with geospatial metadata attached thereto;

means for performing a fast photogrammetric air-triangulation to estimate an average above ground level (AGL) range between a ground elevation associated with the middle of the panorama and a perspective center of said twin cameras;

means for seamlessly stitching said geo-referenced left scene image and said geo-referenced right scene image to form a dual-swath panorama;

means for providing every frame of said left scene and said right scene images with digital elevation models (DEMs) data from predetermined DEM databases; and means for said symmetric twin photogrammetric cameras to collect a pair of focal point shifted images with integrated GPS/IMU measurements for post photogrammetric processing.

6. The symmetric twin camera imaging system as recited in claim 5 wherein said seamlessly stitching means comprises means for forming a registered panorama by purposefully narrowing the perspective center distance of two cameras and the width of the overlapping strip of said left scene image and said right scene image at adjacent edges.

7. The imaging system as recited in claim 5 wherein said system comprises means for generating a trigger pulse for activating said first CCD camera and said second CCD camera to acquire said left scene image and said right scene image simultaneously.

8. The imaging system as recited in claim 5 wherein a left scene processing means comprises a first data acquisition system coupled to a common central processing unit.

9. The imaging system as recited in claim 5 wherein a right scene processing means comprises a second data acquisition system coupled to a common central processing unit.

10. The imaging system as recited in claim 5 wherein said left scene image geo-referencing means comprises means for attaching real time GPS/IMU metadata measurements to each image captured and recorded with known interior orientation estimates including effective focal length, and focal point offset of said first of said twin CCD cameras.

11. The imaging system as recited in claim 5 wherein said right scene image geo-referencing means comprises means for attaching real time GPS/IMU metadata measurements to each image captured and recorded with known interior orientation estimates including effective focal length, and focal point offset of said second of said twin CCD cameras.

12. The imaging system as recited in claim 6 wherein said means for forming a panoramic image by processing the overlap of said left scene image and said right scene image comprises means for measuring the width of said overlapping field and using a width to height lookup table to estimate a real time AGL height.

13. The imaging system as recited in claim 5 wherein said system comprises a size and weight for portability and use in manned and unmanned aerial vehicles.

14. A method for providing a dual-swath imaging system comprising the steps of:

mounting a pair of twin photogrammetric CCD cameras on a remote sensing platform symmetrically adjacent to each other;

providing a first of said twin photogrammetric cameras with a first CCD imager and a nadir pointing first large format optical lens that is capable of imaging an extended panoramic rectangular area with a width twice as wide as that of said CCD imager of said twin cameras;

attaching a first lens shift mount between a body of said first of said twin photogrammetric CCD cameras and said first large format optical lens for physically shifting said first large format optical lens to have the focal point of said first large format optical lens shifted on to the predetermined reference point $x_{left}$;

symmetrically mounting a second of said twin photogrammetric CCD cameras on said platform adjacent to said first of said twin photogrammetric CCD cameras, said second of said twin photogrammetric CCD cameras comprises a second CCD imager and a nadir pointing second large format optical lens;

attaching a second lens shift mount between a body of said second of said twin photogrammetric CCD cameras and said second large format optical lens for shifting said second large format optical lens with a mirrored displacement that makes the focal point of said second large format optical lens on said reference point $x_{right}$;

capturing a left scene image on a left side of a panoramic imaging area of said twin CCD cameras by said first of said twin photogrammetric CCD cameras having a predetermined focal point offset;

capturing a right scene image on a right side of a panoramic imaging area of twin CCD cameras by said second of said twin photogrammetric CCD cameras having a predetermined focal point offset; and aligning in parallel said first principal axis of said first large format optical lens and said second principal axis of said second large format optical lens to obtain seamlessly stitched panoramic images.

15. The method as recited in claim 14 wherein said method comprises the step of forming a dual-swath panoramic image by overlapping of said registered left scene image and right scene image within a predetermined narrow strip.

16. A method for providing a dual-swath imaging system comprising the steps of:

mounting a pair of twin photogrammetric COD cameras on a remote sensing platform symmetrically adjacent to each other;

providing a first of said twin photogrammetric cameras with a first CCD imager and a nadir pointing first large format optical lens that is capable of imaging an extended panoramic rectangular area with a width twice as wide as that of said CCD imager of said twin cameras;

attaching a first lens shift mount between a body of said first of said twin photogrammetric CCD cameras and said first large format optical lens for physically shifting said first large format optical lens to a predetermined point $x_{left}$ to make said reference point $x_{left}$ be on a principal axis of said first large format optical lens;

symmetrically mounting a second of said twin photogrammetric CCD cameras on said platform adjacent to said first of said twin photogrammetric CCD cameras, said second of said twin photogrammetric CCD cameras comprises a second CCD imager and a nadir pointing second large format optical lens;

attaching a second lens shift mount between a body of said second of said twin photogrammetric CCD cameras and said second large format optical lens for shifting said second large format optical lens to a mirrored reference point $x_{right}$ to make said reference point $x_{right}$ be on a focal point of said second large format optical lens;

capturing a left scene image on a left side of said panoramic imaging area of said twin CCD cameras by said first of said twin photogrammetric CCD cameras having a predetermined focal point offset;

capturing a right scene image on a right side of a panoramic imaging area of twin CCD cameras by said second of said twin photogrammetric CCD cameras having a predetermined focal point offset; and aligning in parallel said first principal axis of said first large format optical lens and said second principal axis of said second large format optical lens to obtain seamlessly stitched panoramic image;

providing for the direct geo-referencing of the dual-swath left scene and right scene images onto an earth geographic information system (GIS);

providing every frame of left scene and right scene images with DEMs data from either a predetermined USGS data base or a center strip width lookup table derived AGL of a dual-swath panorama;

providing every frame of said left scene and right scene images with IMU/GPS exterior orientation data, said DEMs, AGL, and interior imaging system orientation data forming geo-spatial frame metadata files in KML format;

combining said frame metadata files with said DEMs data;

solving a left collinearity condition $(x, y)=f(x_{LEFT}; X, Y, Z)$ using required parameter inputs from said frame metadata files and said DEMs data to generate a KML file for said left scene image;

solving a right collinearity condition $(x, y)=f(x_{RIGHT}; X, Y, Z)$ using required parameter inputs from said frame metadata files and said DEMs data to generate a KML file for said right scene image;

converting said left scene and right scene images into a left image JPEG file and a right image JPEG file;

geo-tagging said KML file for left image with said left image JPEG file;

registering said geo-tagged left image on said GIS;

geo-tagging said KML file for right image with said right image JPEG file; and registering said geo-tagged right image on said GIS superimposed on said left image to form a said overlapped and mosaicked panorama image.

* * * * *